J. C. LINCOLN.
VARIABLE SPEED ELECTRIC MOTOR.
APPLICATION FILED MAR. 14, 1906.
1,043,325.
Patented Nov. 5, 1912.
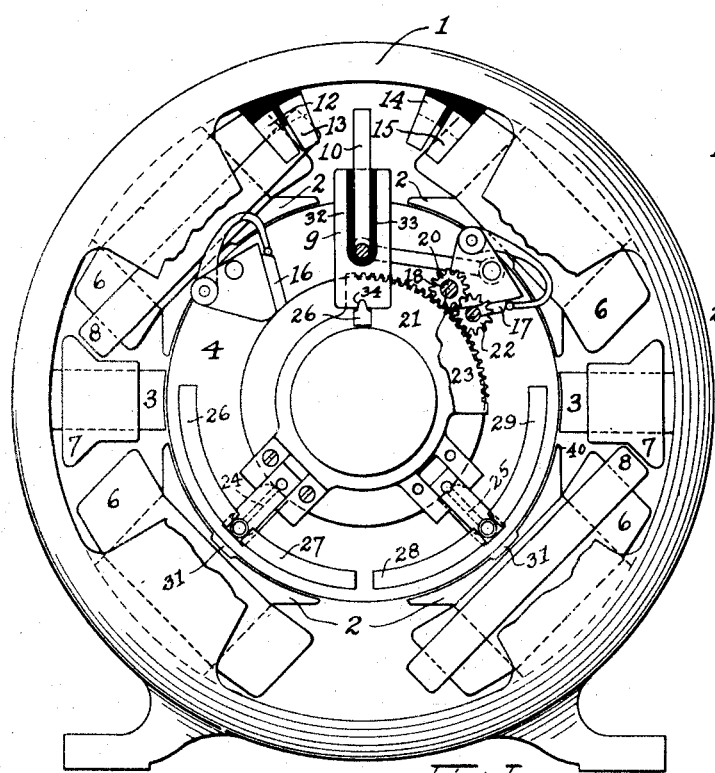
Witnesses:
F. C. Valentine
C. W. Hitchcock
Inventor,
John C. Lincoln
his attorney

UNITED STATES PATENT OFFICE.

JOHN C. LINCOLN, OF EAST CLEVELAND, OHIO, ASSIGNOR TO THE LINCOLN COMPANY, OF CLEVELAND, OHIO, A CORPORATION OF OHIO.

VARIABLE-SPEED ELECTRIC MOTOR.

1,043,325.   Specification of Letters Patent.   Patented Nov. 5, 1912.

Application filed March 14, 1906. Serial No. 306,023.

*To all whom it may concern:*

Be it known that I, JOHN C. LINCOLN, a citizen of the United States of America, and a resident of East Cleveland, in the county of Cuyahoga and State of Ohio, have invented certain new and useful Improvements in Variable-Speed Electric Motors, of which the following is a specification.

My invention relates to improvements in variable speed electric motors, and has for its object, the construction of a motor capable of obtaining wide variations in speed, while being simple, cheap and compact in construction, and economical, efficient and durable in operation.

To this end, my improved motor conforms to a large extent to generally accepted standards in the design of dynamo-electric machinery, but contains in addition, certain features which are pointed out in the following specification and claims, and which secure wide variations in speed, while avoiding certain undesirable features hitherto observed in motors of this general type.

The most common method of securing variation in speed of an electric motor, is by cutting resistance into circuit with the field-windings thereof, but high speeds are impracticable with a construction of this type, except where means are provided for preventing sparking at the brushes. This result may be accomplished by employing a special field construction supplying a commutating field of force for the armature, the windings of said commutating field-structure being in series relation with the armature, but this arrangement involves the highly undesirable feature of making the speed of the armature proportional to the load when operating at high speeds. That is, the speed will increase as the load comes on, instead of remaining constant. Accordingly, I have improved upon this construction to the extent of entirely eliminating the use of regulating resistance for the field-windings, by employing a traveling brush or brushes, between which the currents for the shunt field-windings are taken from the commutator of the armature at varying potentials, and under conditions obtaining a decrease in speed directly proportional with the load, whereby the speed of the armature is accurately governed, and the defective operation above alluded to is counteracted or overcome. Preferably, I employ two traveling brushes, which are associated with suitable contacts, to secure the reversal of current through the field-windings, and avoid the effects of distortion upon the exciting current ordinarily observable in motors of this general type. With this construction, embodying two concurrently moving brushes, it is possible to equip the motor so that not only are effects of distortion practically eliminated, but the increase of speed under heavy loads may be avoided as well. Means may also be provided in my improved motor for avoiding the use of starting resistance, found in specially connected starting-coils provided upon the field-structure in series relation with the armature, which, for a brief period, take an abnormally large current to give the armature an initial impulse, and then are cut out of circuit during the operation of the motor. All the foregoing operations may be controlled by the same controller-mechanism, also of my invention, and herein set forth, together with certain other structural features which will be made clear by referring to the accompanying drawings forming a part of this specification, wherein:—

Figure I. is a side elevation of an electric motor embodying my invention, wherein the supporting arms or spider, connected with the field structure, are shown broken away, and a few of the parts are depicted in section, for the purpose of better illustrating my improvements. Fig. II. is a vertical sectional view of the commutator end of my improved motor. Fig. III. is a diagram setting forth the connections, and indicating the electrical relation of the parts of said motor. Fig. IV. is a detail showing a part of the manually-operated controlling-mechanism; Fig. V. is another detail illustrating, upon enlarged scale, the automatically-operated switch for connecting and disconnecting the starting-coils; and Fig. VI. is a detail view illustrating means for securing the unequal movement of the traveling brushes.

Throughout each of the several figures of the drawings, I have employed the same character of reference to indicate similar parts, in order to avoid any confusion or misunderstanding.

Referring first to Fig. I., it will be seen that the field-structure 1 of this particular motor is provided with four main pole-pieces 2, and two interposed supplemental or commutating pole-pieces 3, within which field-structure the armature 4 is adapted to rotate, preferably upon ball-bearings 5. Shunt windings 6 are positioned upon the main pole-pieces 2, and series windings 7 are provided upon the commutating pole-pieces 3, while, in addition, series starting-coils 8 are superposed upon two of the diametrically-positioned pole-pieces 2, which coils are temporarily in series relation with the armature, and the coils or windings 7, whereby initially, current approximating twice the full load current, will flow through said windings 8, and serve to start the armature. A pivotally mounted switch 9, comprising the duplicate blades 10, 11, adapted alternately to engage paired contacts 12, 13, 14, or 15, is provided for automatically controlling said starting-coils, which, as referred to above, avoid the necessity for employing a resistance-box in starting the motor.

The main brushes of the motor are designated as 16 and 17, which are connected, as shown in Fig. III., with the leads of the energizing circuit of constant potential. Shaft 18, extending through one of the arms of the spider or support, at one side of the motor, carries exteriorly, the hand-wheel 19, and interiorly, the pinion 20, which latter engages the toothed segment 21, and a second pinion 22, meshing in turn with another toothed segment 23. These segments are thus made rotatable in opposite directions by means of the hand-wheel, and respectively carry the movable brushes 24, 25 within their mountings, and, moreover, a spur or tooth 26', is provided upon segment 21, for concurrently actuating the pivoted switch 9. These brushes 24, 25, preferably are so narrow that they will simply span the insulation between two of the commutator segments, being one-sixteenth of an inch in thickness, or equal to twice the width of such insulation in one of my improved motors, as compared with main brushes of one-half inch thickness. Associated with these traveling brushes, are segmental contacts 26, 27, 28 and 29, the alternate contacts of which are connected with each other, while the shunt field-windings 6 are connected between the adjacent contacts 27 and 28; thus providing means for supplying current from the armature through said shunt field-windings 6 in either direction and of varying potential, in order to secure the rotation and reversal of the armature at all of its varying speeds within the range of the motor. These electrical connections will be very readily gathered by making reference to the diagram of Fig. III. Preferably, the main pole-pieces 2 are laterally slotted or channeled at 31, in order to increase the air-gap in this position, for a purpose which will be later explained; although the ordinary segmental polar face indicated in Fig. III., may be employed.

In Fig. V., appears an enlarged view of the automatically-actuated switch for controlling the starting-coils, which comprises the blades 10, 11, one of which is shown mounted in the pivoted holder 32, by means of insulation 33 in position to be swung into engagement with any of the paired contacts 12, 13, 14 and 15, to effect the circuit changes conventionally indicated in the diagram. The lower portion of the holder 32 is recessed at 34, and is adapted to be engaged by the tooth or spur 26', carried upon segment 21, in order that the switch 9 may be automatically actuated to cut the series starting-coils into and out of circuit upon the actuation of hand-wheel 18; it being apparent that the same operation takes place, so far as the starting-coils are concerned, upon throwing the switch either to the right or the left, as will occur when operating the motor in one direction or the other. In order to center the switch, a detent in the form of a roller 36, carried at the end of a spring-actuated arm 37, is adapted to engage a recess 38, provided upon the mounting for the switch blades, whereby the switch will be held in normal position midway between paired contacts 13 and 14, at all times when the motor is not running; while said rollers may be caused to ride upon one or the other of curved edges 39 of the plate, when the switch blades are in engagement with either set of contacts.

For the purpose of explaining the operation of my improved motor, reference will now be had to the diagrammatic figure setting forth in concise form, the electrical features thereof. Normally the traveling brushes 24, 25, between which the shunt field-windings are adapted to be connected, stand at an angle of ninety degrees with respect to each other, and in this position are disconnected from their segmental contacts 26 to 29. Assuming that the armature is to be rotated in a clockwise direction, the hand-wheel will be actuated to turn the switch 9 to the left, which will cause the brushes to diverge and respectively engage contacts 26 and 29; while switch-blades or contacts 10, 11 will be brought into engagement with paired contacts 13, between which the series starting-coils 8 are provided. Current will at once flow from main conductor 34 to brush 16, through the windings of armature 2, brush 17, to the commutating field-windings 7, switch plate 10, the lowermost of the paired contacts 13, the uppermost of paired contacts 14, through the starting-coils 8, the uppermost of paired contacts 13 and switch-blade 11, to main conductor 35. This at once supplies an initial starting torque for the armature, since current approximately equal to twice that supplied at full load, will pass through the motor circuit above indicated. The commutating fields, are, of course, inefficiently positioned in the motor, and consequently cannot serve in this capacity, although receiving the full flow of current. The speed of the armature under the influence of the starting-coils, will immediately pick up, and current will be generated in the windings of the armature, which will be conducted by brush 24, through connected contacts 26 and 28 to the shunt windings 6 of the motor, and through connected contacts 27 and 29 to brush 25, and the armature windings, thus exciting the shunt fields of the motor. The hand-wheel is then turned a little farther to disconnect the starting-coils, but at first short-circuiting the switch-blades 10, 11 between the paired sets of contacts 12, 13, and then disconnecting the coils or windings 8 upon the complete throw of the switch. Circuit may then be traced from main 34, through brush 16, the windings or armature 2, brush 17, the commutating field-windings 7 and short-circuited switch-blades 10, 11, to main 35, which is the normal running position of the motor. In order to increase the speed at which the armature is driven, it is only necessary to continue the rotation of the hand-wheel in the same direction, so that the brushes 24, 25 will continue to diverge while in engagement with the respective contacts 26, 29, in order that they may subtend an increasing arc of the commutator. This, as will be well understood, causes current of decreasing voltage to flow through the main or shunt field-windings 6, and, as a result, the magnetic flux into the armature decreases and the speed is correspondingly increased. Initially, however, the movement of the brushes from their normal or neutral positions, through the first ten or fifteen degrees of separation causes practically very little variation in the flow of current through the shunt field-windings; but inasmuch as said brushes are so mounted as to mutually diverge or converge toward parts upon the commutator having less difference of potential, the speed of the armature is very simply and easily regulated thereby. At high speeds, however, it is practically necessary to provide means for overcoming the sparking which otherwise will occur at the brushes of the motor, and, accordingly, I have provided between the main poles of the motor, the secondary magnetic systems found in the pole-pieces 3, which carry the series windings 7. Thereby the armature windings are subjected over restricted areas to the lines of magnetic force generated by these secondary or commutating magnetic systems, so that the armature coils at the moment of commutation have generated therein a counter electro-motive force in opposition to the current previously flowing therein, whereby the one tends to reverse the other, and sparking is prevented. These series wound coils, as previously adverted to, however, introduce into the motor the highly undesirable feature of causing the speed to increase proportionately with the increase in load, instead of remaining constant under varying conditions of load. To obviate this feature, I preferably design the shunt field structure, in accordance with principles well understood in the art, so that with equal movements of the brushes, the flux increases from ten to fifteen per-cent. as the load increases, and, in consequence, the tendency will be to cause the speed to decrease, which I have found is sufficient to overcome the above mentioned tendency of the speed to increase under additional load. In other words, these two diverse tendencies oppose one another in my improved motor, when properly designed, and the speed, in consequence, will remain as adjusted, practically constant under all varying loads.

Another important function which I now desire to refer to, and which is of very great importance in variable speed electric motors of this class, is the distortion effect which results at high speeds in the main magnetic field. This distortion depends upon the ratio between the ampere turns in the field-windings and upon the armature, and since the former are necessarily greatly reduced under high speed conditions, the lines of magnetic force tend to concentrate or bunch at those extreme edges of the main pole-pieces 2 which the armature is approaching, as at 40, Fig. III., if we assume that the armature is rotating in a clockwise direction. Consequently, the magnetic field is very strong in such positions of approach, and becomes so weakened at the leaving or opposite edges of the pole-pieces 41, as to exhibit actual reversal of polarity under the influence of the armature at high speeds. Consequently, if a single traveling brush is employed to take off the varying currents for exciting the shunt fields, said brush must travel over a very large arc, and because of the distortion effect above referred to, the field excitation would vary proportionately to such distortion, and, in consequence, the speed control would be irregular and impracticable. This results from the fact that at high speeds, the traveling and its co-acting stationary brush would subtend an arc embracing one or the other of the extremities or edges of a given pole-piece. As just stated, the leaving edge of such pole-piece would be very deficiently excited at high speeds under heavy load, while the meeting edge would be correspondingly over-excited. Hence, if the brush subtended an arc including the former, the voltage generated necessarily would be proportional to the magnetic flux from the leaving edge of the pole-piece into the armature. Such flux decreases very greatly as the load comes on at high speeds, and at the highest speeds this flux will even reverse at full load. Therefore, the voltage generated between these two brushes would decrease, and even reverse in polarity at high speeds, as the load comes on. The action which would take place if the moving brush and its co-acting stationary brush subtend an arc embracing the pole-piece which the armature is approaching, would be the opposite of the action just described. Under this extremity, the flux from the extremity of the pole-piece into the armature would increase several hundred per-cent. at high speeds, from no load to full load, thereby varying the current through the shunt field to a corresponding degree. It is clear that at high speeds, excitation derived from a moving brush and a co-acting stationary brush would be utterly impractical. My improved construction overcomes this undesirable feature, by reason of the fact that the brushes are mutually caused to diverge or approach preferably at equal rates of speed in securing regulation of the speed of the motor, whereby as one of said brushes is caused to approach or recede from the coils under excitation of the strongly excited field, the other brush correspondingly approaches or recedes from the coils under excitation of a weakened and distorted magnetic field, and the one distorting effect exactly counterbalances the other. In other words, the use of two traveling brushes causes the voltage to remain constant, by reason of their subtending a portion of the field which remains constant under all conditions of load. At high speeds, the moving brushes may approach each other quite closely, and in consequence, a small movement of the traveling brushes causes a considerable change in the current flowing through the shunt field, and a correspondingly large change in the resulting speed of the motor. In order to permit of a greater motion of the moving brushes when obtaining a given variation of speed, the central portions of the main field-poles 2 are laterally cut away, as shown at 31. This cutting away increases the air-gap, and consequently decreases the flux passing from the pole-piece into the armature through the angle subtended by the cut-away portion. if the flux is decreased to one-half its original value by this means, twice the motion of the moving brushes will be required to obtain a given change in speed, than would be required if the center of the pole-piece was not cut away. This increased motion of the moving brushes in order to obtain a given change in speed, it is clear, will take place only when the brushes are close enough together or far enough apart to subtend that portion of the armature excited by the portion of the pole-piece which is cut away.

Referring again to the connections shown in Fig. III., it will be seen that my improved motor is equally well adapted for operation in the opposite or contra-clockwise direction, and that corresponding results are obtained by reversing the direction of rotation of the hand-wheel, since the only difference is to cause a reversal of current temporarily supplied to the starting-coils and a corresponding reversal of current taken from the armature at various potentials between the brushes 25, 26, and circulating through the shunt field-windings 6, all of this being accomplished in the well known manner of supplying reversing switch connections for these parts as shown.

While I have stated that the preferred construction of my improved variable speed electric motor is such that the traveling brushes shall have equal movement toward or from each other, I desire now to explain in connection with the diagram, Fig. III., a feature of construction and operation which lends itself to obtaining different results in the structure of my invention. In said diagram, I have indicated by the right angle 43, 42, 44, the normal position of the brushes with respect to the exciting pole-piece, and by the angle 45, 42, 46, the position of maximum adjustment of said brushes, wherein the highest speed of the motor will be attained. These angles, it is to be understood, are intended to indicate the position of, or the arc subtended by the brushes with respect to the electro-magnetic structure of the motor, rather than their bodily position. It is apparent, that by proportioning the pinions 20, 22, as by giving the latter thirteen teeth, as opposed to twelve upon the former, it will be possible to cause the unequal rotation of the engaged segments 21, 23, and a correspondingly unequal movement of the traveling brushes. As a result, the position of maximum adjustment of said brushes may be approximately indicated by the dotted lines forming the angle 47, 42, 48, thereby causing the brushes 24, 25, to subtend an arc embracing armature coils excited by the weakened and distorted field represented by portion 41 of the pole-piece. This will cause a decrease in flux as compared with that obtained when the brushes subtend an arc represented by the angle 45, 42, 46, and the result will be an increase of speed proportional to such decrease in flux as the load comes on. In other words, by causing one of the brushes to travel more rapidly in the direction of rotation of the armature as compared with movement of the other, a distinctly different result is obtained than before, wherein the motor is equipped, as described, to secure a small counteracting drop in speed through the brush adjustment as the load comes on. This, and other of my improvements, may be applied to dynamo electric machines differing substantially from the variable speed motor which I have selected as enabling me best to explain my invention.

The illustration which I have above given, although representing an experimental modification of one of my improved motors, should be understood as being merely typical, and arbitrarily selected to indicate the result obtainable by securing unequal movement of the brushes. It will be understood that an unequal movement of the brushes in a reverse direction will secure corresponding results, with reversal of the armature's rotation, or opposite results without such reversal of rotation.

From a consideration of the foregoing, it will be appreciated that I have improved upon the variable speed electric motor, by equipping the same with concurrently traveling brushes to neutralize the effects of distortion upon the magnetic field thereof, observable at high speeds, and have counteracted the tendency of the commutating or interpolar magnetic system to increase the speed under increase in load, by combining therewith means for correspondingly affecting the motor to decrease its speed under similar conditions; this means being present in the design of the motor to cause an increased flux from the field-structure to the armature with an increased load. However, I desire to be understood that my invention is in no wise restricted to this corrective feature, since the motor of my invention is equally capable of design whereby the flux will remain substantially constant under varying loads at any given speed, to which end the mutually traveling brushes are adapted to supply current of proper potential to the shunt field windings.

Having now described a variable speed electric motor embodying my improvements, and set forth distinguishing features of its construction and operation, as I understand them, I claim as new, and desire to secure by Letters Patent, together with such modifications as may be made by those ordinarily skilled in the art, the following;—

1. In a variable speed electric motor, the combination with the field-structure thereof equipped with shunt windings, of an armature mounted to rotate within said field-structure, stationary brushes and two mutually traveling brushes engaging the commutator of said armature, mechanism for effecting the concurrent movement of said traveling brushes toward or from each other, whereby the current in the shunt field-windings connected with said brushes may be maintained at constant values in any of the positions of adjustment of said brushes, and switch contacts associated with said brushes for effecting the reversal of current throughout the shunt field-windings, substantially as set forth.

2. In a variable speed electric motor, the combination with a composite field-structure consisting of main poles normally excited by shunt windings and equipped with series windings or starting-coils, of an armature mounted to rotate within said field-structure, traveling brush mechanism engaging the commutator of said armature and connected to supply current through the shunt field-windings, a secondary switch for cutting the series starting-coils into and out of circuit, and means for actuating the traveling brush mechanism and concurrently moving said switch to connect and disconnect the starting-coils, substantially as set forth.

3. In a variable speed electric motor, the combination with a composite field-structure consisting of main poles normally excited by shunt windings and equipped with series windings or starting-coils, of an armature mounted to rotate within said field-structure, traveling brush mechanism engaging the commutator of said armature and connected to supply current through the shunt field-windings, reversing-switch contacts positioned to be engaged by said traveling brush mechanism for effecting the reversal of current through the shunt field-windings as the brushes are moved in one direction or the other, a secondary switch for cutting the series starting-coils into and out of circuit, and means for actuating the traveling brush mechanism and concurrently moving said switch to connect and disconnect the starting-coils, substantially as set forth.

4. In apparatus of the class described, the combination with a magnetic field-structure or system, and its armature mounted to rotate therein, of traveling brush mechanism engaging the commutator of the motor comprising narrow brushes bearing upon the contact-bars thereof, two toothed segments rotatably mounted and respectively carrying the brush-holders, and two meshing pinions respectively engaging the segments and adapted to actuate said segments and brushes to move in opposite directions, substantially as set forth.

5. In apparatus of the class described, the combination with a magnetic field-structure or system, and its armature mounted to rotate therein, of traveling brush mechanism engaging the commutator of the motor comprising narrow brushes bearing upon the contact-bars thereof, two toothed segments rotatably mounted and respectively carrying the brush-holders, two meshing pinions respectively engaging the segments and adapted to actuate said segments and brushes to move in opposite directions, and an auxiliary switch associated with one of said moving segments whereby said switch is concurrently actuated at predetermined periods during the movement of the brushes, substantially as set forth.

6. In apparatus of the class described, the combination with a magnetic field-structure or system, and its armature mounted to rotate therein, of traveling brush mechanism engaging the commutator of the motor comprising narrow brushes bearing upon the contact-bars thereof, reversing-switch contacts associated with said traveling brushes and adapted alternately to be electrically engaged by said brushes dependent upon the direction of movement thereof, two toothed segments rotatably mounted and respectively carrying the brush-holders, and two meshing pinions respectively engaging the segments and adapted to actuate said segments and brushes to move in opposite directions, substantially as set forth.

7. In a dynamo electric machine, the combination with the field-structure, of an armature mounted to rotate therein, said field-structure having its polar-faces laterally channeled or cut-away throughout restricted areas presented to the armature, whereby the air-gap is materially increased over such areas, and traveling brush mechanism associated with the armature and affording an increased path of movement for adjustment in the positions corresponding to the channeled polar-faces, substantially as set forth.

8. In a variable speed electric motor, the combination with a main field-structure provided with windings in shunt relation with the armature and series windings or starting-coils, narrow auxiliary poles provided with series windings and positioned between the main poles, narrow traveling brushes engaging the commutator of the armature between which the shunt windings are connected, a switch for connecting and disconnecting the starting-coils, and mechanism for concurrently controlling the switch and effecting the mutual travel of the aforesaid brushes, substantially as set forth.

9. In a dynamo electric machine, the combination with the field-structure thereof equipped with shunt field-windings, an armature mounted to rotate within said field-structure, two traveling brushes forming the terminals of the shunt field-windings, and means for effecting the concurrent and unequal travel of said brushes in opposite directions upon the commutator of the armature, whereby the field excitation and the flux to the armature may be varied, substantially as set forth.

10. In a dynamo electric machine, the combination with the field-structure thereof equipped with shunt field-windings, an armature mounted to rotate within said field-structure, two traveling brushes forming the terminals of the shunt field-windings, means for effecting the concurrent and unequal travel of said brushes in opposite directions upon the commutator of the armature, whereby the field excitation and the flux to the armature may be varied, and means for subjecting restricted areas of the armature to a commutating field to avoid sparking at the brushes under conditions of heavy load, substantially as set forth.

Signed at Cleveland, this 12th day of March, A. D. 1906, in the presence of two subscribing witnesses.

JOHN C. LINCOLN.

Witnesses:
EDWARD H. WALSH,
J. D. MALLOY.